(12) United States Patent
Chang et al.

(10) Patent No.: US 8,036,527 B2
(45) Date of Patent: Oct. 11, 2011

(54) APPARATUS AND METHOD FOR PROTECTION SWITCHING OF OPTICAL CHANNEL

(75) Inventors: Sun-hyok Chang, Daejeon (KR); Hwan-seok Chung, Daejeon (KR); Sang-soo Lee, Daejeon (KR); Kwang-joon Kim, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 796 days.

(21) Appl. No.: 12/053,400

(22) Filed: Mar. 21, 2008

(65) Prior Publication Data

US 2009/0060504 A1    Mar. 5, 2009

(30) Foreign Application Priority Data

Aug. 30, 2007  (KR) .................. 10-2007-0087741

(51) Int. Cl.
G02F 1/00 (2006.01)
G02F 2/00 (2006.01)
H01S 3/00 (2006.01)
H04B 10/00 (2006.01)
H04J 14/00 (2006.01)

(52) U.S. Cl. ............................................. 398/2
(58) Field of Classification Search .................. 398/2
See application file for complete search history.

(56) References Cited

U.S. PATENT DOCUMENTS

| | | | | |
|---|---|---|---|---|
| 5,771,225 | A * | 6/1998 | Iino | 370/217 |
| 6,973,267 | B1 | 12/2005 | Arecco et al. | |
| 7,200,104 | B2 | 4/2007 | Saleh et al. | |
| 7,817,540 | B1 * | 10/2010 | Daruwalla et al. | 370/220 |
| 2003/0169470 | A1 * | 9/2003 | Alagar et al. | 359/110 |
| 2005/0238361 | A1 * | 10/2005 | Marmur et al. | 398/140 |
| 2006/0104638 | A1 * | 5/2006 | Chung et al. | 398/71 |
| 2006/0268686 | A1 * | 11/2006 | Shei et al. | 370/217 |
| 2006/0269282 | A1 * | 11/2006 | Gerstel | 398/19 |

FOREIGN PATENT DOCUMENTS

| | | |
|---|---|---|
| KR | 20010054988 | 7/2001 |
| KR | 20010058245 | 7/2001 |
| KR | 1020030060614 | 7/2003 |

OTHER PUBLICATIONS

Korean Office Action for Application No. 10-2007-0087741, dated Dec. 9, 2008.

* cited by examiner

Primary Examiner — Ken Vanderpuye
Assistant Examiner — Jermaine Wilson
(74) Attorney, Agent, or Firm — Nelson Mullins Riley & Scarborough LLP; EuiHoon Lee, Esq.

(57) ABSTRACT

An apparatus and method for protection switching of an optical channel at each node in an optical network based on wavelength division multiplexing optical transmission technology are provided. The method can be applied to any node having at least two optical fiber inputs and outputs. The apparatus includes: a splitter receiving an electrical signal and splitting the received electrical signal into a plurality of electrical signals which are substantially identical to the received electrical signal; an output switching unit selecting output paths of the electrical signals split by the splitter according to an optical channel path control command of the optical network; and a plurality of optical transponders being assigned to the respective output paths of the electrical signals, converting the electrical signal input by the selection of the output switching unit to an optical signal, and transmitting the converted optical signal to another node of the optical network.

4 Claims, 7 Drawing Sheets

APPARATUS AND METHOD FOR PROTECTION SWITCHING OF OPTICAL CHANNEL

CROSS REFERENCE TO RELATED APPLICATIONS

This application claims priority from Korean Patent Application No. 10-2007-0087741, filed on Aug. 30, 2007, the disclosure of which is incorporated herein in its entirety by reference.

BACKGROUND OF THE INVENTION

1. Field of the Invention

The present invention relates to an optical network based on wavelength division multiplexing optical transmission technology and, more particularly, to an apparatus and method for protection switching of an optical channel at each node in an optical network.

This work was supported by the IT R&D program of Ministry of Information and Communication (MIC)/Institute for Information Technology Advancement (IITA) [2006-S059-02. ASON based Metro photonic cross-connector technology].

2. Description of the Related Art

Wavelength division multiplexing (WDM) optical transmission technology has been rising as a solution to the sharp increase in demand for transmission capacity. The WDM optical transmission technology makes it possible to simultaneously transfer a plurality of wavelength channels through a single optical fiber. For example, assuming that one wavelength channel transfers 50 wavelength channels at a rate of 10 Gb/s, the total transfer rate amounts to 500 Gb/s. As can be seen from this example, the WDM optical transmission technology is very useful in high-capacity data transmission.

Meanwhile, in order to increase the efficiency and flexibility of an optical network that puts the WDM optical transmission technology into practice, technology for adding and dropping a wavelength channel at a network node is required. Such a requirement is fulfilled by fixed optical add-drop multiplexer (FOADM) technology. Furthermore, reconfigurable optical add-drop multiplexer (ROADM) technology makes it possible not only to increase the efficiency of the optical network but also to make a more economical use of network resources, etc. The use of the ROADM technology allows a certain channel to be added or dropped at a certain node, so that the network can be operated with higher efficiency.

Meanwhile, in order to further increase the efficiency of the ROADM technology, along with the development of the ROADM technology, it is predicted that an optical network topology will gradually develop from a simple point-to-point or ring type to a complicated mesh type.

However, due to its high transfer rate of 2.5 Gb/s to 40 Gb/s and the transmission of high-capacity data, situations may become serious when the signal quality of optical channel is degraded during the transmission. In order to solve this problem, an increasing interest is taken in the problems associated with protection switching of the optical channel, and furthermore it is essential to find a solution to this problem. The optical network topology of a simple point-to-point or ring type, which is commonly used at present, employs a 1+1 protection switching method. If a signal is not transmitted through one of optical fibers due to cutoff of the optical fiber or problems with, for example, an optical amplifier, another signal transmitted through the other optical fiber is detected and processed. In other words, a main signal and a sub signal are set on the basis of a signal transmission system. Thus, when the main signal has a problem with the transmission, the sub-signal is processed.

Hereinafter, reference will be made about conventional protection switching of an optical channel signal in the optical network that puts into practice the WDM optical transmission technology having this technical background with reference to FIGS. 1 through 3.

FIG. 1 illustrates the configuration of a ring-type optical network in which a conventional method for protection switching of an optical channel is realized.

As illustrated in FIG. 1, four nodes A, B, C and D interact to transmit and receive data. Each node is connected to neighboring nodes through two optical fibers P and W. One of the optical fibers P and W is a working fiber W as a main optical fiber, through which traffic runs in a clockwise direction. The other optical fiber P is a protection fiber, through which traffic runs in a counterclockwise direction when the working fiber W has any problem.

For example, in the case of traffic proceeding from the node B to the node A, a transmitter of the node B splits a signal into two identical signals, and then transfers one of the two signals through the working fiber W and the other signal through the protection fiber P. A receiver of the node A has a switch to select data received through the working fiber W and the protection fiber P. As illustrated in FIG. 1, the receiver of the node A receives the signal through the working fiber W in a normal condition. However, when the working fiber W is partly cut off, the receiver of the node A may receive the signal through the protection fiber P. This technique is known as a unidirectional path switched ring (UPSR). More specifically, the traffic, which is transmitted through one transmission path, is additionally transmitted using another transmission path, so that the signal can be transmitted to its destination even when the signal fails to be transmitted through one transmission path.

FIG. 2 is a block diagram illustrating the configuration of a conventional apparatus for protection switching of an optical channel. As illustrated in FIG. 2, the conventional optical channel protection switching apparatus includes a splitter 200 for splitting a signal, which is input in order to conduct the aforementioned 1+1 protection switching, into multiple signals, a switch 210, and optical transponders 220a and 220b. Each of the optical transponders 220a and 220b includes an optical transmitter, an optical receiver, and other additional elements, and performs optical/electrical and electrical/optical signal conversion, that is, converts an optical signal to an electrical signal, and an electrical signal to an optical signal.

First, when transmitting the signal, the splitter 200 splits an input electrical signal into two electrical signals and outputs the two electrical signals to the optical transponders 220a and 220b. The optical transponders 220a and 220b convert the input electrical signals to optical signals. The optical signals are transmitted to another node through the working fiber P and the protection fiber P, respectively, via a device, such as ROADM or FOADM, or a photonics cross-connect switch (PXC).

Further, the optical signals, which are received from the other node through the working fiber P and the protection fiber P, are converted to electrical signals by the optical transponders 220a and 220b, and then the converted electrical signals are output. At this time, the switch 210 selects the signal received through the working fiber W in a normal operation. However, when the working fiber W is not in a normal condition, the switch 210 selects the signal received through the protection fiber P.

FIG. 3 is a block diagram illustrating the configuration of another conventional apparatus for protection switching of an optical channel. As illustrated in FIG. 3, the conventional optical channel protection switching apparatus includes an optical transponder 300, a splitter 200 and a switch 210. The optical transponder 300 converts an electrical signal to an optical signal, and outputs the optical signal. The splitter 200 splits the optical signal, which is output from the optical transponder 300, into two identical signals, and then transmits the two signals through the working and protection fibers W and P, respectively. The splitter 200 may be either an optical divider or an optical coupler. The split signals are transmitted to another node through the working fiber W and the protection fiber P, respectively, via a device, such as ROADM or FOADM, or a photonics cross-connect switch (PXC).

Further, the switch 210 selects one of the optical signals, which are received from the other node through the working and protection fibers. During normal operation, the switch 210 selects the signal received through the working fiber W. However, when the working fiber W is not in a normal condition, the switch 210 selects the signal received through the protection fiber P. The optical transponder 300 converts the optical signal, which is selected by the switch 210, to an electrical signal, and then outputs the electrical signal.

The conventional protection switching of the optical channel signal has been described above with reference to FIGS. 1 through 3. The protection switching of the optical channel signal as described above may be applied to an existing point-to-point or ring topology. However, as already mentioned above, the optical network topology is predicted to become more complicated, and ultimately develop into the mesh topology.

FIG. 4 illustrates the configuration of a mesh-type optical network. Twelve nodes A through L are connected to one another, each of which is connected to neighboring nodes through two optical fibers. In the case of a point-to-point or ring type optical network, each node is connected with two neighboring nodes and thus has two inputs and two outputs for the optical fibers. However, in the case of the mesh-type optical network, each of the nodes A, D, I and L has two inputs and two outputs, each of the nodes F and G has four inputs and four outputs, and each of the nodes B, C, E, H, J, and K has three inputs and three outputs. In other words, in the case of the mesh-type optical network, the number of the inputs and the number of outputs vary depending on the position of the node. Thus, the optical channel protection switching apparatus, in which each node has two inputs and outputs of the optical fibers as illustrated in FIGS. 2 and 3, can no longer be applied to the mesh-type optical network. Furthermore, the mesh-type optical network can set various traffic paths, where intermediate nodes may be included in more traffic paths. However, one or more protection fibers may be provided in addition to the working fiber, causing a wastage of resources.

SUMMARY OF THE INVENTION

The present invention provides an apparatus and method for protection switching of an optical channel, which can be applied to nodes each having at least two inputs and two outputs of optical fibers in a mesh-type optical network.

The present invention is intended to ensure stable and reliable signal transmission in the optical network.

Additional aspects of the invention will be set forth in the description which follows, and in part will be apparent from the description, or may be learned by practice of the invention.

The present invention discloses an apparatus for protection switching of an optical channel including: a splitter receiving an electrical signal and splitting the received electrical signal into a plurality of electrical signals which are substantially identical to the received electrical signal; an output switching unit selecting output paths of the electrical signals split by the splitter according to an optical channel path control command of the optical network; and a plurality of optical transponders being assigned to the respective output paths of the electrical signals, converting the electrical signal input by the selection of the output switching unit to an optical signal, and transmitting the converted optical signal to another node of the optical network.

Each optical transponder may convert the optical signal input from the other node to the electrical signal. The apparatus may further include an input switching unit, which receives two electrical signals having transmission paths different from each other in the optical network from the plurality of optical transponders, and selects one of the received electrical signals, the selected one having a transmission path which is in a normal condition according to optical channel path monitor information of the optical network.

The present invention also discloses an apparatus for protection switching of an optical channel including: an optical transponder converting an input electrical signal to an optical signal, and outputting the converted optical signal; a splitter receiving the optical signal output from the optical transponder, and splitting the received optical signal into a plurality of optical signals which are substantially identical to the received optical signal; and an output switching unit being connected to at least one other node of the optical network through optical fibers, and selecting a part of the optical fibers to output the optical signals, which are split by the splitter, through the respective optical fibers according to an optical channel path control command of the optical network.

The present invention also discloses a method for protection switching of an optical channel at each node in an optical network based on wavelength division multiplexing optical transmission technology, including: receiving an electrical signal, and splitting the received electrical signal into a plurality of electrical signals, which are substantially identical to the received electrical signal; selecting output paths of the split electrical signals according to an optical channel path control command of the optical network; and converting the electrical signal output through the selected output path to an optical signal, and transmitting the converted optical signal to another node of the optical network.

The present invention also discloses a method for protection switching of an optical channel at each node in an optical network based on wavelength division multiplexing optical transmission technology, including: receiving an electrical signal, converting the received electrical signal to an optical signal, and outputting the converted optical signal; and receiving the output optical signal, splitting the received optical signal into a plurality of optical signals, which are substantially identical to the received optical signal, and transmitting the split optical signals to another node of the optical network through an output path selected according to an optical channel path control command of the optical network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
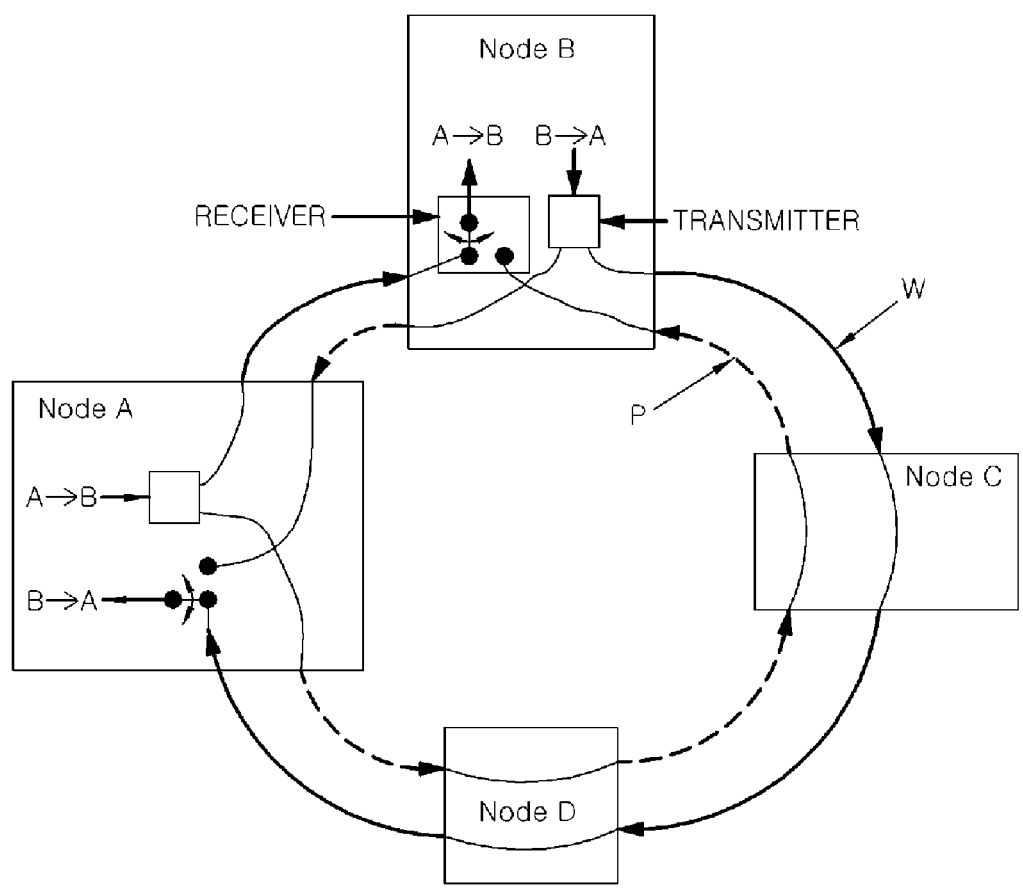
FIG. 1 illustrates the configuration of a ring-type optical network in which a conventional method for protection switching of an optical channel is realized.
Figure 2:
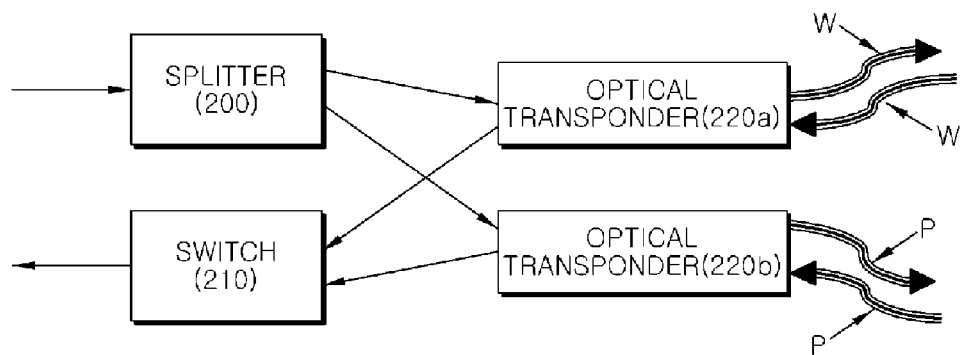
FIG. 2 is a block diagram illustrating the configuration of a conventional apparatus for protection switching of an optical channel.
Figure 3:
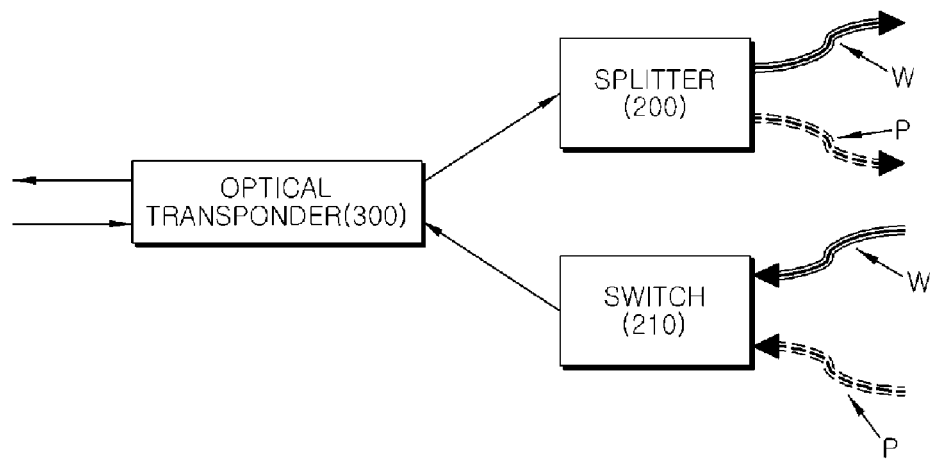
FIG. 3 is a block diagram illustrating the configuration of another conventional apparatus for protection switching of an optical channel.
Figure 4:
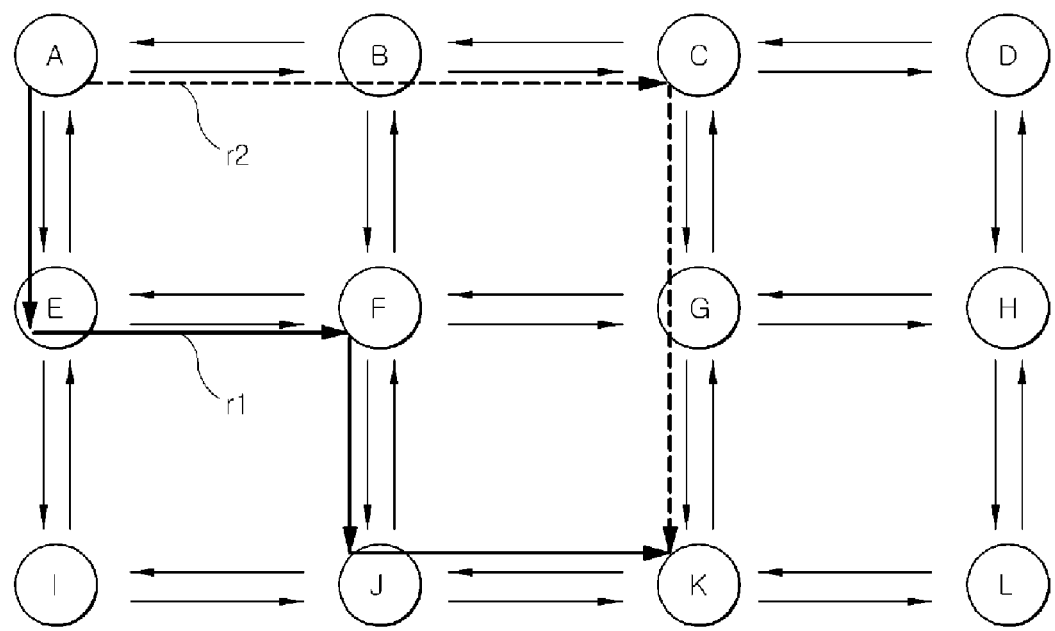
FIG. 4 illustrates the configuration of a mesh-type optical network.

In a mesh optical network illustrated in FIG. 4, there are several paths for traffic from one node to the other one. For example, for traffic delivered from a node A to a node K, paths such as A→E→F→J→K(r1), A→B→C→G→K(r2), and A→B→C→D→H→L→K may be provided.

The paths are determined depending on network resources. The paths may be determined, for example, according to whether or not a certain wavelength or an optical transponder is available, or a transmission distance. This is referred to as routing and wavelength assignment (RWA).

Figure 5:
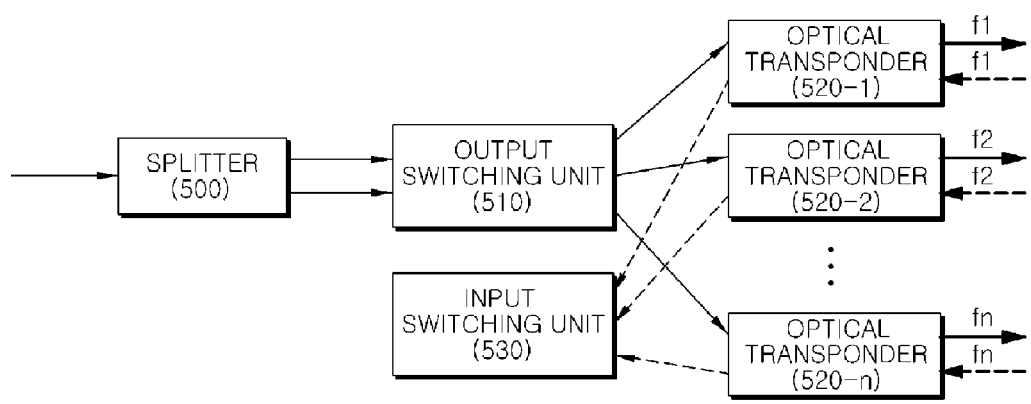
FIG. 5 is a block diagram illustrating the configuration of an apparatus for protection switching of an optical channel according to an exemplary embodiment of the present invention.

FIG. 5 is a block diagram illustrating the configuration of an apparatus for protection switching of an optical channel according to an exemplary embodiment of the present invention.

An optical network according to this exemplary embodiment is of a mesh type. FIG. 5 shows the configuration of the optical channel protection switching apparatus applied to a node having n optical fiber inputs and outputs, in which optical transponders 520-1, 520-2 . . . 520-n are connected to outputs of the respective optical fibers f1, f2 . . . fn. The optical channel protection switching apparatus includes a splitter 500, an output switching unit 510, n optical transponders 520-1, 520-2 . . . 520-n, and an input switching unit 530.

The splitter 500 receives an electrical signal, and splits the received electrical signal into at least two electrical signals, each of which is substantially identical to the received electrical signal. Preferably, the splitter 500 further includes an element such as an amplifier in order to equalize the amplitude of the split electrical signals. Here, any element that is capable of amplifying the electrical signal will do for the amplifier.

The output switching unit 510 selects output paths of the electrical signals split by the splitter 500 according to an optical channel path control command of the optical network. In the inventive optical channel protection switching apparatus provided to a source node, for example, the node A of FIG. 4, the output switching unit 510 receives the optical channel path control command from a processor, which takes charge of an optical communication system constructing the node of the optical network. At this time, the optical channel path control command may include information on two optical fibers, a working fiber and a protection fiber, between a source node and a destination node. The output switching unit 510 switches such that the electrical signals split by the splitter 500 are output to only two of the optical transponders 520-1, 520-2 . . . 520-n, wherein the two optical transponders are connected to the working fiber and the protection fiber. Thus, only two optical transponders, arbitrarily selected from among the optical transponders 520-1, 520-2 . . . 520-n, obtain the electrical signals.

The optical transponders 520-1, 520-2 . . . 520-n are assigned to output paths of the electrical signals respectively, convert the electrical signals, which are input by the selection of the output switching unit 510, to optical signals, and output the converted optical signals. The output optical signals are transmitted to another node of the optical network via equipment such as a reconfigurable optical add-drop multiplexer (ROADM) or a fixed optical add-drop multiplexer (FOADM), or a photonics cross-connect switch (PXC). Each optical transponder includes an optical transmitter, an optical receiver, and other additional elements, and performs optical/electrical and electrical/optical signal conversion, that is, converts an optical signal to an electrical signal, and an electrical signal to an optical signal.

Further, in the inventive optical channel protection switching apparatus provided to the destination node, for example, the node K of FIG. 4, the input switching unit 530 receives optical signals having the wavelength identical to each other, from two of the optical transponders 520-1, 520-2 . . . 520-n, wherein the two optical transponders are provided to the preset working and protection fibers. The input switching unit 530 selects one of the identical electrical signals which are received from two of the optical transponders 520-1, 520-2 . . . 520-n, wherein a transmission path of the selected electrical signal is in a normal state according to optical channel path monitor information of the optical network. During normal operation, the input switching unit 530 selects the signal transmitted through the working fiber. However, in the case in which the working fiber is not in a normal condition according to the optical channel path monitor information, the input switching unit 530 selects the signal transmitted through the protection fiber. The input switching unit 530 receives the optical channel path monitor information from a processor, which takes charge of an optical communication system constructing a node of the optical network.

Figure 6:
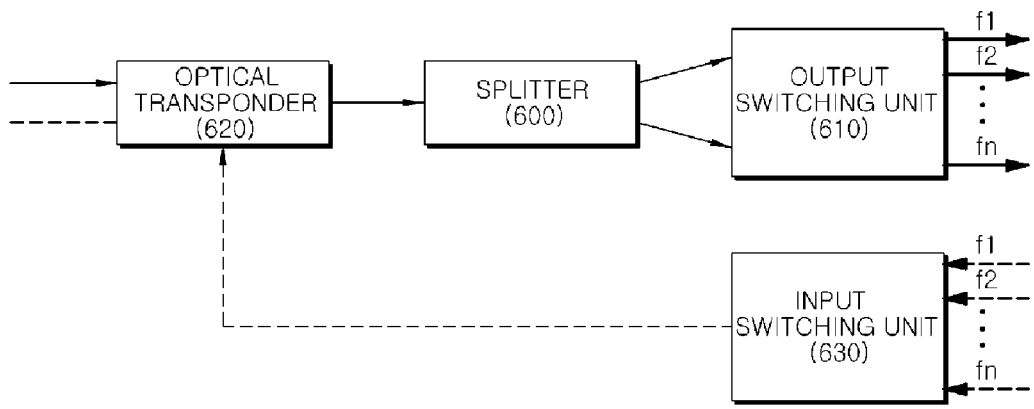
FIG. 6 is a block diagram illustrating the configuration of an apparatus for protection switching of an optical channel according to another exemplary embodiment of the present invention.

FIG. 6 is a block diagram illustrating the configuration of an apparatus for protection switching of an optical channel according to another exemplary embodiment of the present invention.

An optical network according to this exemplary embodiment is characterized by a mesh shape. FIG. 6 shows the configuration of the optical channel protection switching apparatus having an optical transponder 620. The optical transponder 620 converts an input electrical signal to an optical signal, and then outputs the converted optical signal. A splitter 600 splits the optical signal, which is output from the optical transponder 620, into at least two optical signals, each of which is substantially identical to the output optical signal. In this exemplary embodiment, the splitter 600 preferably includes at least one selected from the group consisting of an optical divider, an optical coupler, and an optical splitter.

An output switching unit 610 is connected with at least one of other nodes of the optical network through the optical fibers. The output switching unit 610 receives an optical channel path control command from a processor, which takes charge of an optical communication system constructing a node of the optical network. The output switching unit 610 determines output paths of at least two optical signals, which are split and output by the splitter 600, and switches such that the optical signals are output only to the optical fibers, which correspond to the working and protection fibers among total n optical fibers. Thus, the optical signals are transmitted through only the two optical fibers connected to the working and protection fibers among the n optical fibers.

An input switching unit 630 obtains optical signals having transmission paths are different from each other in the optical network, through two of n optical fibers f1, f2 ... fn connected with other nodes of the optical network. The input switching unit 630 switches one of the two optical signals, and then provides the selected one to the optical transponder 620. At this time, the input switching unit 630 selects the optical signal having a transmission path which is in a normal state according to optical channel path monitor information of the optical network. During normal operation, the input switching unit 630 selects a signal transmitted through the working fiber. However, in the case in which the working fiber is abnormal according to the optical channel path monitor information, the input switching unit 630 selects a signal transmitted through the protection fiber. The input switching unit 630 receives the optical channel path monitor information from a processor, which takes charge of an optical communication system constructing a node of the optical network.

Figure 7:
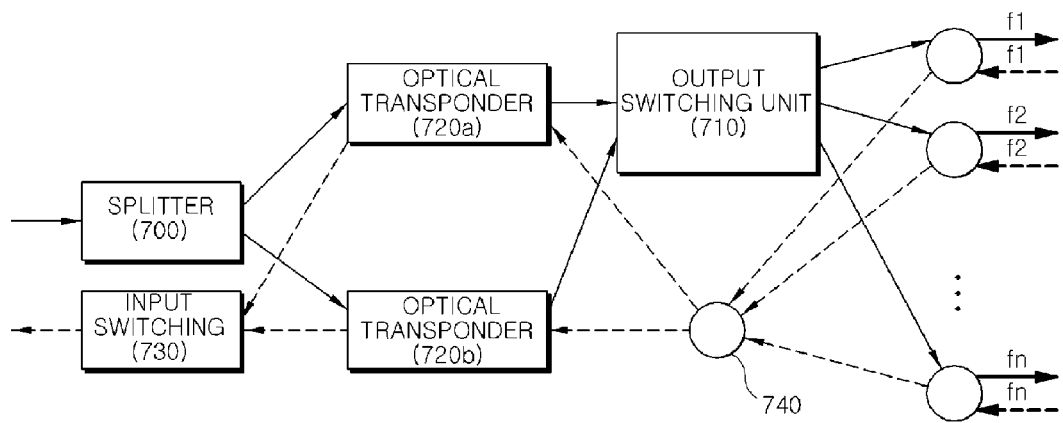
FIGS. 7 and 8 are block diagrams illustrating the configuration of an apparatus for protection switching of an optical channel according to yet another exemplary embodiment of the present invention.
Figure 8:
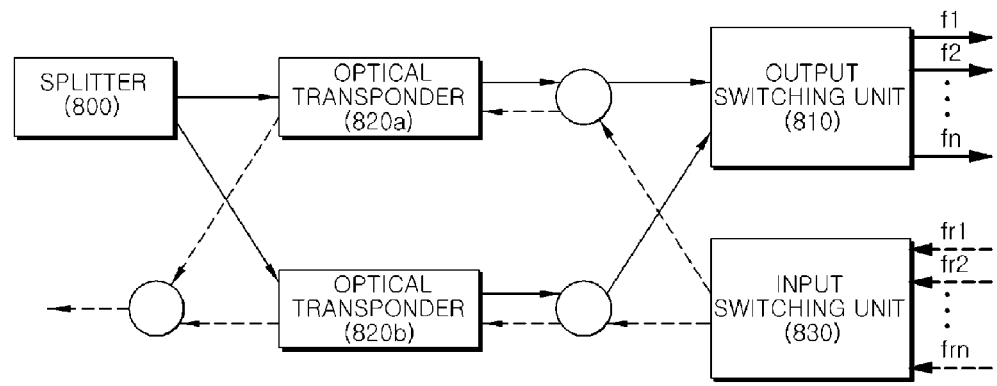

FIGS. 7 and 8 are block diagrams illustrating the configuration of an apparatus for protection switching of an optical channel according to yet another exemplary embodiment of the present invention.

FIG. 7 shows an optical channel protection switching apparatus having two optical transponders 720a and 720b. A splitter 700 splits an input electrical signal, into at least two electrical signals, each of which is substantially identical to the input electrical signal, and outputs the split electrical signals to the respective optical transponders 720a and 720b. Each of the optical transponders 720a and 720b converts an input electrical signal to an optical signal. For example, the optical transponder 720a may be set to process the signal transmitted through the working fiber, while the optical transponder 720b may be set to process the signal transmitted through the protection fiber. Although the number of neighboring nodes is two or more, signals that are actually processed and transmitted in the present invention are the signal transmitted through the working fiber and the signal transmitted through the protection fiber. Thus, both the optical transponders 720a and 720b may be set to operate in conjunction with each other.

An output switching unit 710 receives an optical channel path control command from a processor, which takes charge of an optical communication system constructing a node of the optical network, as described above. The output switching unit 710 receives two identical optical signals from the optical transponders 720a and 720b. The output switching unit 710 determines output paths of the two optical signals, and switches such that the optical signals are output to only the optical fibers, which correspond to the working and protection fibers among total n optical fibers.

The switching unit 740 is connected with n optical fibers f1, f2 ... fn, which are connected with other nodes of the optical network, and receives two optical signals from two of the optical fibers, which correspond to the working and protection fibers. Then, the switching unit 740 outputs the received optical signals to the optical transponders 720a and 720b. Further, the switching unit 740 may be set to transmit the signal, which is received through the working fiber, to the preset optical transponder 720a, and to transmit the signal, which is received through the protection fiber, to the other optical transponder 720b. An input switching unit 730 selects an electrical signal having a transmission path which is in a normal state according to optical channel path monitor information of the optical network, from two electrical signals received from the optical transponders 720a and 720b.

As illustrated in FIG. 8, two optical transponders 820a and 820b are set to operate in conjunction with each other as described above. When the signals are input, an input switching unit 830 may be realized so as to select only one signal having a transmission path which is in a normal state, among signals received from the optical fibers f1, f2 ... fn, and to output the selected signal to one of the optical transponders 820a and 820b.

Figure 9:
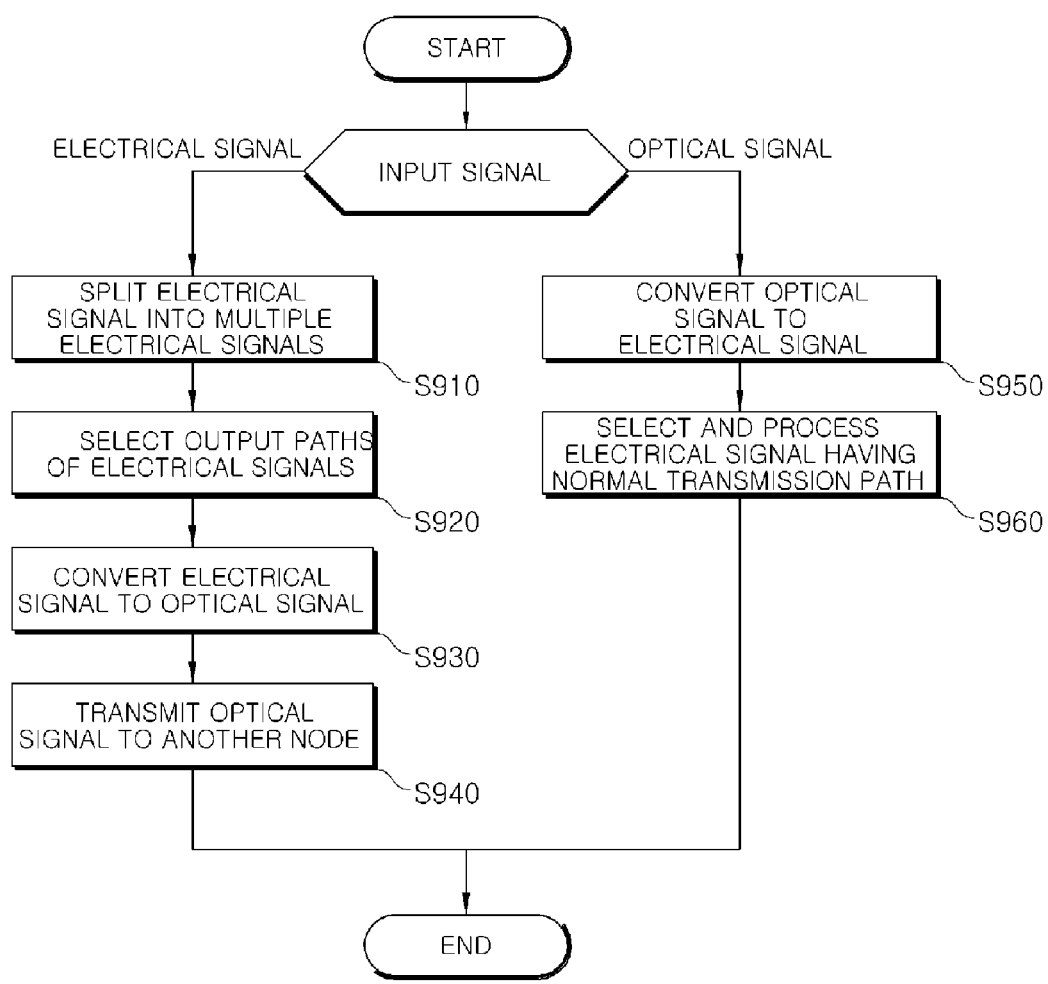
FIG. 9 is a flow chart illustrating a method for protection switching of an optical channel according to an exemplary embodiment of the present invention.

FIG. 9 is a flow chart illustrating a method for protection switching of an optical channel according to an exemplary embodiment of the present invention.

First, an electrical signal is input. The input electrical signal is split into a plurality of signals, each of which is substantially identical to the input electrical signal (S910). This may be realized by technical configuration in which the electrical signal is split and amplified. Then, output paths of the split electrical signals are selected (S920). The output paths of the electrical signals may be received from a processor, which takes charge of an optical communication system constructing a node of the optical network. An optical channel path control command may include information on two optical fibers, a working fiber and a protection fiber, between a source node and a destination node. Only optical transponders assigned to a part of the optical fibers are activated according to the output paths of the electrical signals. When the transmission path is determined, the electrical signals are converted to optical signals, respectively (S930). The optical signals are transmitted to another node through the optical fibers along the set paths (S940).

Meanwhile, when two optical signals are received from the other node, the received optical signals are converted to electrical signals (S950). Then, an electrical signal having a normal transmission path is selected as an alternative signal, and then is processed (S960).

Figure 10:
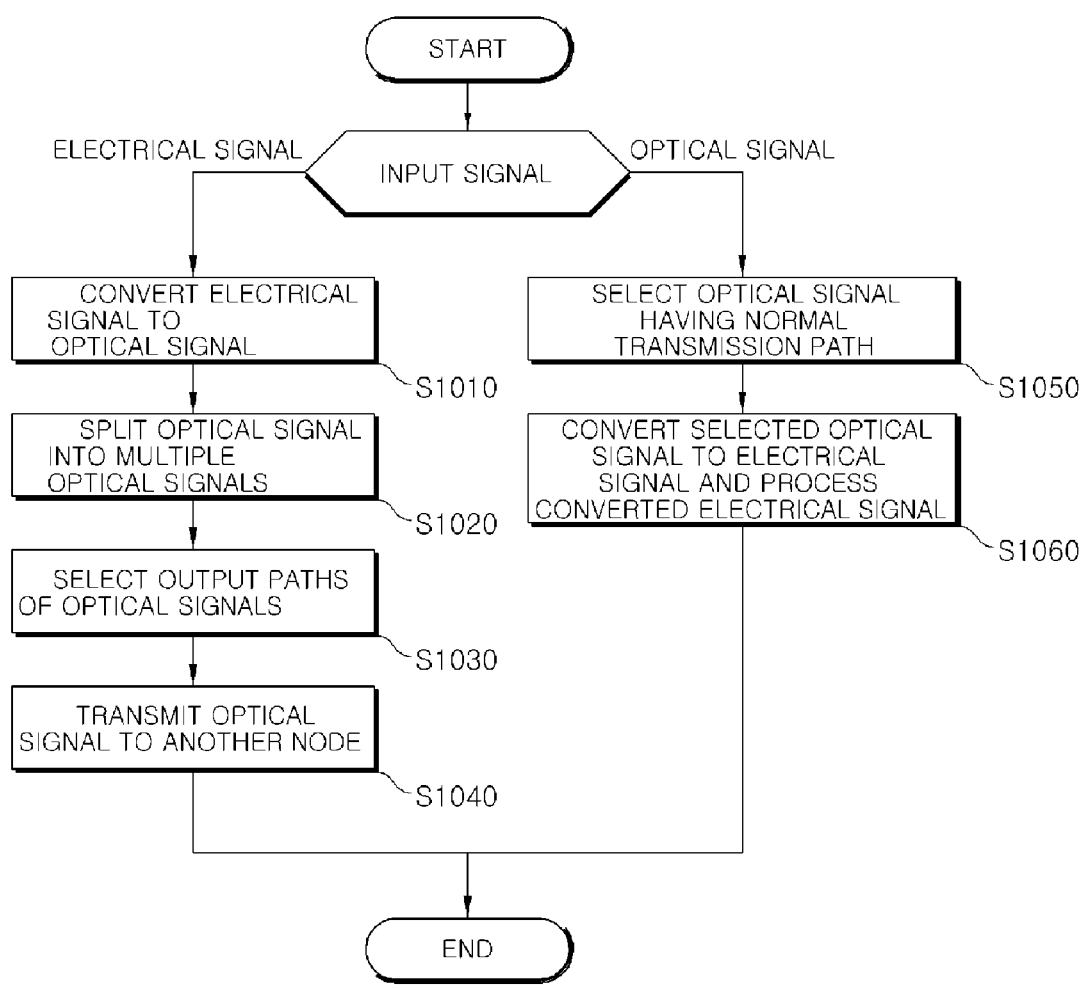
FIG. 10 is a flow chart illustrating a method for protection switching of an optical channel according to another exemplary embodiment of the present invention.

FIG. 10 is a flow chart illustrating a method for protection switching of an optical channel according to another exemplary embodiment of the present invention.

First, an electrical signal is input. The input electrical signal is converted to an optical signal (S1010). Afterwards, the converted optical signal is split into a plurality of identical signals (S1020). This may be performed using at least one of an optical divider, an optical coupler, and an optical splitter. Then, output paths of the split optical signals are selected (S1030). Output paths of the optical signals may be received from a processor such as a control plane processor, which takes charge of an optical communication system constructing a node of the optical network. An optical channel path control command may include information on two optical fibers, a working fiber and a protection fiber, between a source node and a destination node. The optical signals are transmitted to another node along the set transmission paths (S1040).

Meanwhile, when optical signals are received from the other node, an optical signal having a normal transmission path is selected as an alternative signal (S1050). Thereafter, the optical signal having the normal transmission path is converted into an electrical signal, and then is processed (S1060).

Meanwhile, the optical channel protection switching method is realized by a computer program. The program may be executed in a manner such that it is stored in computer readable media and is read by a computer. The media include magnetic recording media, optical recording media, and so on.

According to the present invention, signals are transmitted through only two selected from among output paths at any node having at least two optical fiber inputs and outputs, so that the optical channel protection switching method can be applied to any node in a complicated mesh-type optical network.

In other words, the signals can be more stably transmitted in a complicated optical network that has been predicted, so that reliability of the signal transmission in the network can be improved.

As can be seen from the foregoing, the present invention can be applied to a field associated with a mesh topology optical network that employs WDM optical transmission technology.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for protection switching of an optical channel, which is provided to each node in an optical network based on wavelength division multiplexing optical transmission technology, the apparatus comprising:
   a splitter receiving an electrical signal and splitting the received electrical signal into a plurality of electrical signals which are substantially identical to the received electrical signal;
   an output switching unit selecting output paths of the electrical signals split by the splitter according to an optical channel path control command of the optical network; and
   a plurality of optical transponders being assigned to the respective output paths of the electrical signals, converting the electrical signal input by the selection of the output switching unit to an optical signal, and transmitting the converted optical signal to another node of the optical network,
   wherein the optical channel path control command comprises information on a working fiber and a protection fiber between a source node and a destination node so that the electrical signals split by the splitter are output to the optical transponders, which are connected to the working fiber and the protection fiber, respectively.

2. The apparatus of claim 1, wherein each optical transponder converts the optical signal input from the other node to an electrical signal and outputs the converted electrical signal, and further comprising an input switching unit receiving two electrical signals having transmission paths different from each other in the optical network from the plurality of optical transponders, and selecting one of the received electrical signals, the selected one having a transmission path which is in a normal condition according to optical channel path monitor information of the optical network.

3. The apparatus of claim 2, wherein the optical network is of a mesh type.

4. A method for protection switching of an optical channel at each node in an optical network based on wavelength division multiplexing optical transmission technology, the method comprising:
   receiving an electrical signal, and splitting the received electrical signal into a plurality of electrical signals, which are substantially identical to the received electrical signal;
   selecting output paths of the split electrical signals according to an optical channel path control command of the optical network; and
   converting the electrical signal output through the selected output path to an optical signal, and transmitting the converted optical signal to another node of the optical network,
   wherein the optical channel path control command comprises information on a working fiber and a protection fiber between a source node and a destination node so that the electrical signals split by the splitter are output to the optical transponders, which are connected to the working fiber and the protection fiber, respectively.

* * * * *